United States Patent
Byrne

[19]

[11] Patent Number: 6,027,352
[45] Date of Patent: *Feb. 22, 2000

[54] ELECTRICAL INTERCONNECTION ASSEMBLY WITH PIVOTAL END CONNECTOR

[76] Inventor: Norman R. Byrne, 2736 Honey Creek, NE., Ada, Mich. 49301

[ * ] Notice: This patent issued on a continued prosecution application filed under 37 CFR 1.53(d), and is subject to the twenty year patent term provisions of 35 U.S.C. 154(a)(2).

[21] Appl. No.: 08/763,476

[22] Filed: Dec. 11, 1996

[51] Int. Cl.$^7$ ...................................................... H01R 13/56
[52] U.S. Cl. ............................................. 439/215; 439/446
[58] Field of Search ..................................... 439/215, 446

[56] References Cited

U.S. PATENT DOCUMENTS

| | | | |
|---|---|---|---|
| 1,187,010 | 6/1916 | Rodrigues | 439/446 |
| 2,540,575 | 2/1951 | Finizie | 439/446 |
| 4,551,577 | 11/1985 | Byrne | 174/57 |
| 4,762,072 | 8/1988 | Boundy et al. | 108/50 |
| 4,959,021 | 9/1990 | Byrne | 439/446 |
| 5,013,252 | 5/1991 | Nienhuis et al. | 439/215 |
| 5,073,120 | 12/1991 | Lincoln et al. | 439/215 |
| 5,096,431 | 3/1992 | Byrne | 439/171 |
| 5,096,434 | 3/1992 | Bynre | 439/215 |
| 5,164,544 | 11/1992 | Snodgrass et al. | 439/215 |
| 5,178,555 | 1/1993 | Kilpatrick et al. | 439/215 |
| 5,259,787 | 11/1993 | Byrne | 439/557 |

OTHER PUBLICATIONS

AMP Products for the office of the 80's and beyond;AMP, Incorporated; 1984.

*Primary Examiner*—Gary F. Paumen
*Attorney, Agent, or Firm*—Varnum, Riddering, Schmidt & Howlett LLP

[57] ABSTRACT

An electrical interconnection assembly (19) is disclosed for use in a wall system having a four-panel configuration (10). Each of the panels includes a raceway with an interconnection assembly (19) disposed therein. Each interconnection assembly (19) includes a junction block (22) capable of receiving an electrical receptacle block (100). Female connector block pairs (34, 34A) associated with an end of the junction block (22) are each provided with a pair of side flanges (90) for engagement with flanges (125) of a pivotable male connector (120). A power cable assembly (20) includes a conduit (114) attached to the pivotable male connector (120). The conduit (114) is pivotable relative to the pivotable male connector (120) through a pivot assembly (160, 161).

3 Claims, 6 Drawing Sheets

ELECTRICAL INTERCONNECTION ASSEMBLY WITH PIVOTAL END CONNECTOR

BACKGROUND OF THE INVENTION

1. Field of the Invention

The invention pertains to electrical interconnection systems and more particularly to such systems for use in distributing electrical power to modular wall panels or the like.

2. Prior Art

Known interior wall systems typically employ prefabricated modular wall units which are joined together in various configurations to divide a work space into smaller offices or work areas. Generally, such modular wall panels are equipped with raceways, for example along a bottom edge of the modular panels, for housing electrical cable assemblies and junction blocks in order to provide electrical outlets and electrical power connections to adjacent panels. The electrical cable assemblies typically include a flexible conduit is housing a plurality of electrical wires. Rigid end connectors are mechanically attached to the flexible conduit and electrically attached to the wires for joining the wires to a junction block.

The modular panels of a space-divider system may be configured such that adjacent panels are in a straight line or at various angular positions relative to each other. It is common to configure intersecting walls in such a fashion that three or four modular wall panels intersect at right angles. Each of the panels typically requires electrical outlets, and may require outlets on both sides of the panels. In any event, electrical power has to be provided to all of the panels and often only one of the panels at the multiple panel junction is connected to a power supply source. Some modular wall panels and their associated raceways are narrow in cross-section. These narrow wall panels are typically joined together in a particular configuration such that an angle is formed between any two adjacent wall panels. In this instance, it becomes very difficult if not impossible to feed an electrical cable assembly between the adjacent wall panels, due to the size of the rigid end connectors of the cable assemblies.

An example of a prior art system is shown in U.S. Pat. No. 5,096,434 to Byrne, the subject matter of which is incorporated herein by reference, and includes an interconnecting system in each wall panel comprising an electrical junction block having four receptacle connectors formed integral thereto for receiving electrical outlet receptacles and a pair of rigid end connectors electrically connected to the junction block for connection to similar end connectors from adjacent panels. However, when this system is installed in narrow or thin-line wall panels, the length of the rigid end connectors do not permit the cable assemblies to fit around the corners created by two adjacent wall panels.

SUMMARY OF THE INVENTION

These and other problems of the prior art are overcome by means of an interconnecting system comprising an electrical interconnection assembly for each panel which includes an electrical junction block having a plurality of receptacle connectors formed integral thereto for interchangeably receiving electrical outlet receptacles and power cable assemblies. A power cable attaches between a wall panel junction block and a power is source for supplying power to the junction block. The power cable assemblies can be connected between junction blocks of adjacent panels in order to supply power to the junction blocks and/or to any cables or outlet receptacles attached thereto. The electrical cable assemblies include a flexible conduit housing a plurality of electrical wires. Pivoting end connectors are mechanically attached to the flexible conduit and electrically attached to the wires for joining the wires to a junction block.

In accordance with another aspect of the invention, an end connector is pivotal at a point spaced away from the intersection of the end connector and conduit.

BRIEF DESCRIPTION OF THE DRAWING

An illustrative embodiment of the invention is described in the following detailed description, with reference to the drawing in which.

DETAILED DESCRIPTION

Figure 1:
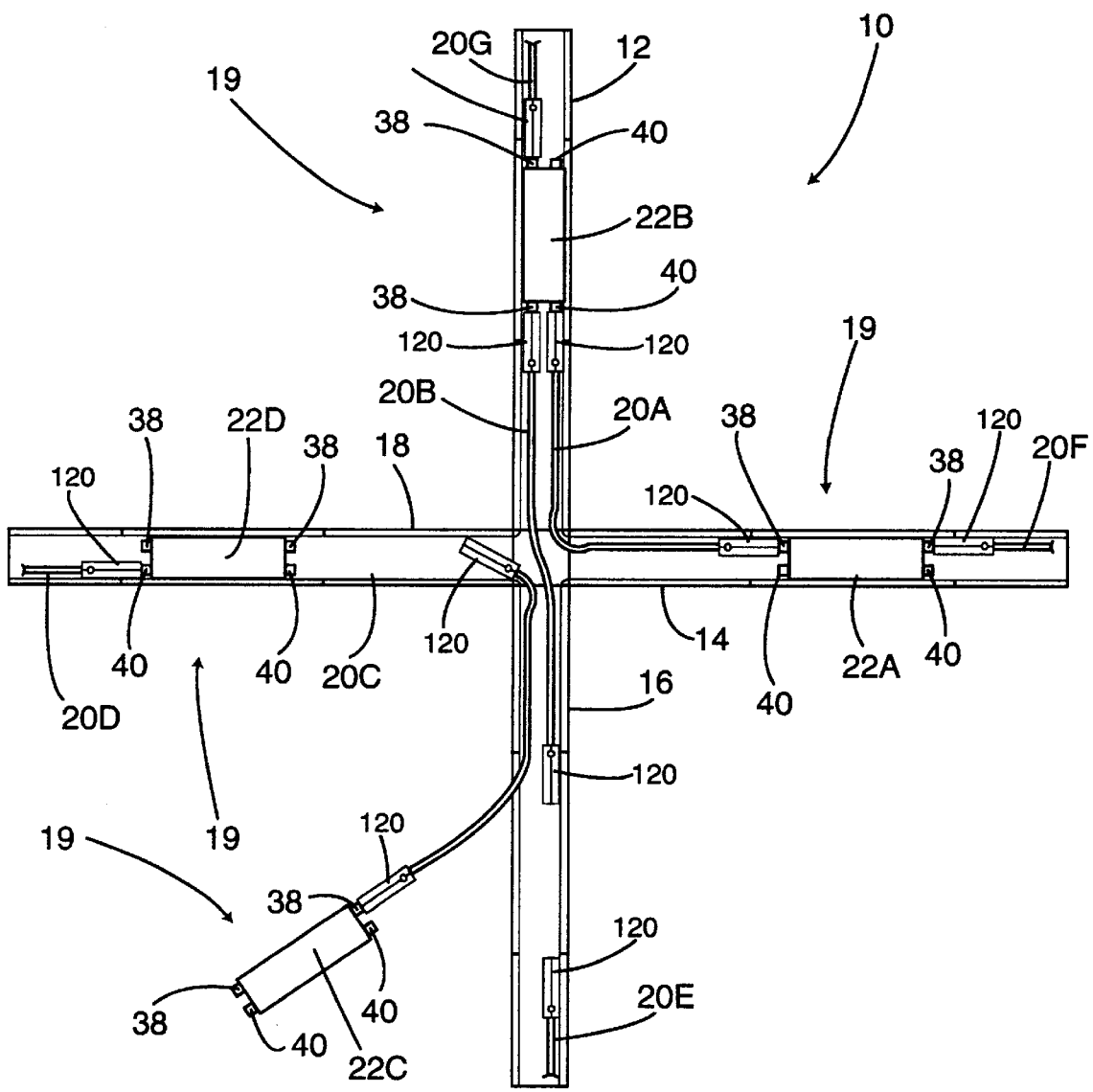
FIG. 1 is a fragmentary plan view of raceway areas of four wall panels, illustrating wall panel interconnection assemblies in accordance with the invention.
Figure 2:
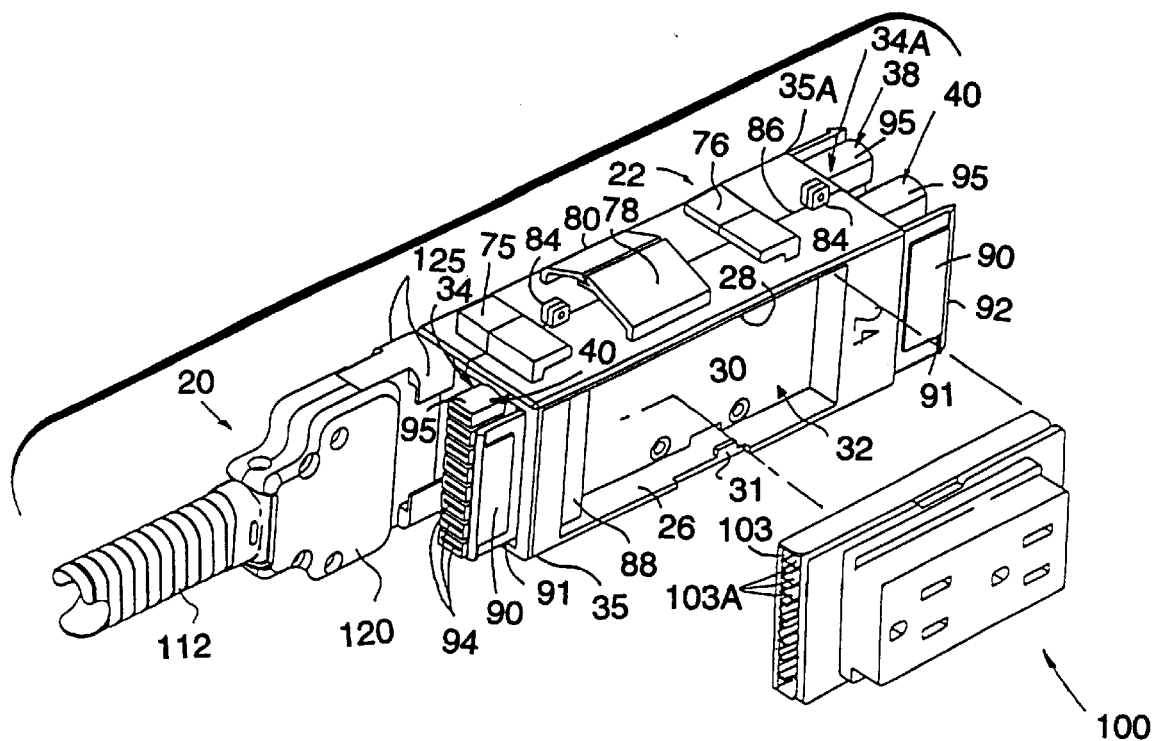
FIG. 2 is an enlarged perspective view of one of the junction block assemblies of an electrical interconnection assembly of FIG. 1.
Figure 3:
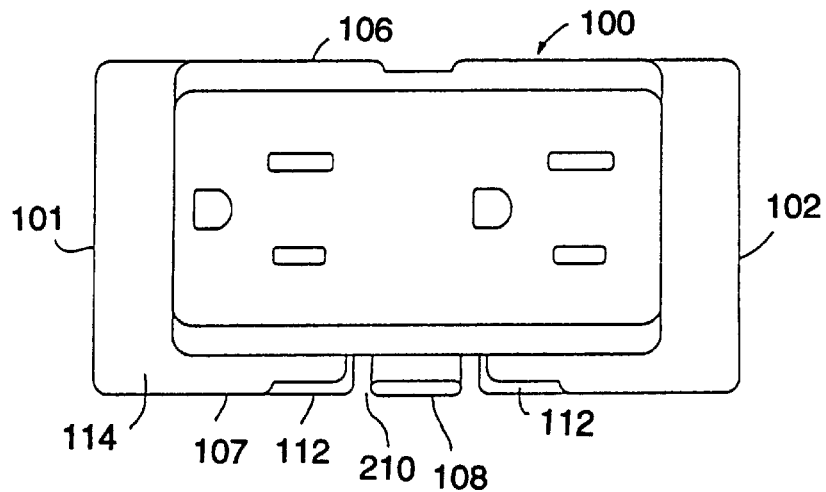
FIG. 3 is an enlarged side view of a receptacle block which forms part of the junction block assembly of FIG. 2.

FIG. 1 is a fragmentary plan view of raceway areas of four wall panels illustrating the connections of interconnection assemblies of the invention in a configuration in which the four panels are disposed at right angles to each other. As will be apparent from the following description, the specific angle at which the panels are positioned is not particularly significant. Furthermore, the invention is equally applicable to any number of panels configured at various angles. FIG. 1 shows the raceway portions 12, 14, 16, and 18 of a four-panel configuration 10 wherein the panels are disposed at right angles to each other. Each of the four panels is provided with an interconnection assembly 19, comprising one or more junction blocks 22 and power cable assemblies 20A–20F interconnecting the junction blocks 22. A junction block 22 is disposed within each panel raceway, such that opposite sides of the junction block can be exposed outside the raceway through raceway openings. Each junction block has a pair of recesses 32 for mounting one or more electrical outlet receptacle blocks 100 (FIGS. 2 and 3). Receptacle blocks 100 provide power to electrical equipment (not shown) located in proximity to the panels. Each junction block 22 includes a female connector block pair 34 at one end and a female connector block pair 34A at another end as illustrated in FIG. 2. Each female connector block pair 34, 34A can be independently interconnected to one or more power cable assemblies 20A–20F, and are each provided with two columns 38, 40 of a plurality of female connector terminals for connection to male connector terminals of the power cable assemblies. Column 38 is electrically connected to column 40 in a similar manner as described in my U.S. Pat. No. 5,096,434. As shown in FIG. 1, a power cable 21 connects junction block 22A to an external power source. Power cable assembly 20A electrically interconnects junction blocks 22A and 22B; power cable assembly 20B electrically interconnects junction blocks 22B and 22C; and power cable assembly 20C is adapted for electrically interconnecting junction blocks 22C and 22D. Thus, the single power cable 21 can provide power to all of the junction blocks through the power cable assemblies located in the wall panel configuration 10. Power cable assemblies 20D–20G are provided for the electrical connection of additional junction blocks (not shown) which may be part of the four-panel configuration or other panels.

Additional details regarding the interconnection assembly 19 are illustrated in the enlarged orthographic view as shown in FIG. 2. A junction block 22 has a lower wall 26, an upper wall 28 and a middle wall 30 which form an open spatial area 32 on each side of the junction block 22 (only one side of which is illustrated in FIG. 2). In addition, the block 22 includes a female connector block pair 34 extending outwardly from a first end 35 of junction block 22, and a second female connector block pair 34A extending outwardly from a second end 35A of junction block 22. One female connector block pair 34 can be electrically connected to the other female connector block pair 34A of junction block 22 through internal wiring (not shown) in the junction block.

A female receptacle connector 88 is located within each half of junction block 22 within open spatial area 32. Electrical outlet receptacle blocks 100 (FIGS. 2 and 3) are adapted to engage the female receptacle connectors 88. In this manner, each of the junction blocks 22 is adapted to support, if desired, two electrical outlet receptacle blocks 100, one on each side of the junction block 22.

With further reference to FIG. 2, female connector block pairs 34, 34A are each provided with a pair of side flanges 90 having upper and lower recessed areas 91, for engagement with flanges 125 of a pivotal male connector 120 which forms part of power cable assembly 20. Flanges 90 are made of a resilient plastic material and formed integral to the housing to which they are connected and are provided with an outwardly extending inclined end surface 92. When end surfaces 92 of the side flanges 90 are engaged by flanges 125 of male connector 120, the side flanges 90 will be deflected inward, allowing flanges 125 to engage recess areas 91 to provide a mechanical locking engagement of the male and female connectors. The female connector block pairs 34, 34A are each provided with two columns 38, 40 of a plurality of female connector terminals 94 and a key lug 95. The pivotal male connector 120 of cable assembly 20 is provided with a plurality of male connector terminal spaces 12 for the reception of male connector terminals 122A, and a key opening 124 for receiving key lug 95.

For the purpose of releasably securing junction block 22 to the wall panel raceways 12, 14, 16 and 18, a mounting system includes a pair of L-shaped mounting lugs 75, 76 and interlocking latch members 78, 80 integrally mounted on or molded to the top of the upper wall 28. The junction block 22 may also be provided with connection lugs 82, 84 for securing preformed halves of the junction block 22 together along a seam line 86 as further illustrated in FIG. 2. This mounting system is similar to my U.S. Pat. No. 4,993,576, which is herein incorporated by reference. It is to be noted that the two halves of junction block 22 as defined by seam line 86 are identical and therefore a description with respect to one half of the junction block refers also to the other half Turning now to FIGS. 2 and 3, an electrical outlet receptacle block 100 for connection to female receptacles 88 of junction block 22 is shown. Receptacle block 100 includes a first open end 101 and a second open end 102. First and second open ends 101, 102 include a plurality of terminal spaces 103 for the reception of male terminals 103A for connection with a plurality of female terminals (not shown) located in the female receptacle connectors 88 on the junction block 22. An upper receptacle portion 104 includes one or more receptacles 105 for receiving receptacle plugs (not shown) of electrically operated equipment. An upper wall 106 and lower wall 107 are spaced apart in order to provide a snug fit between upper wall 28 and lower wall 26 of the junction block. Receptacle 100 is provided with a spring latch 108 disposed in recess 110 in the lower wall 107 of receptacle 100. Lower wall 107 engages the lower wall 26 when the receptacle 100 is installed in the junction block. The locking flange 31 on lower wall 26 will be aligned with recess 110 when the receptacle 100 is inserted between the upper and lower walls 28, 26, causing the spring latch 108 to be depressed. The receptacle 100 may then be moved to either the left or to the right (depending on which side of the junction block receptacle 100 is being installed) to engage one of the open ends 101, 102 such that male terminals 103A engage female terminals (not shown) within receptacle 88. Recesses 112 are provided in receptacle 100 to accommodate locking flange 31 on lower wall 26. Movement of the receptacle to either the left or the right by a sufficient distance will cause the spring latch 108 to be moved past locking flange 31, causing the spring latch 108 to return to its extended position. Hence, receptacle 100 will be retained in a locked position. The receptacle 100 may be removed by depressing spring latch 108 and sliding the receptacle 100 to either the left or right to align the locking flange 31 with recess 110.

Figure 5:
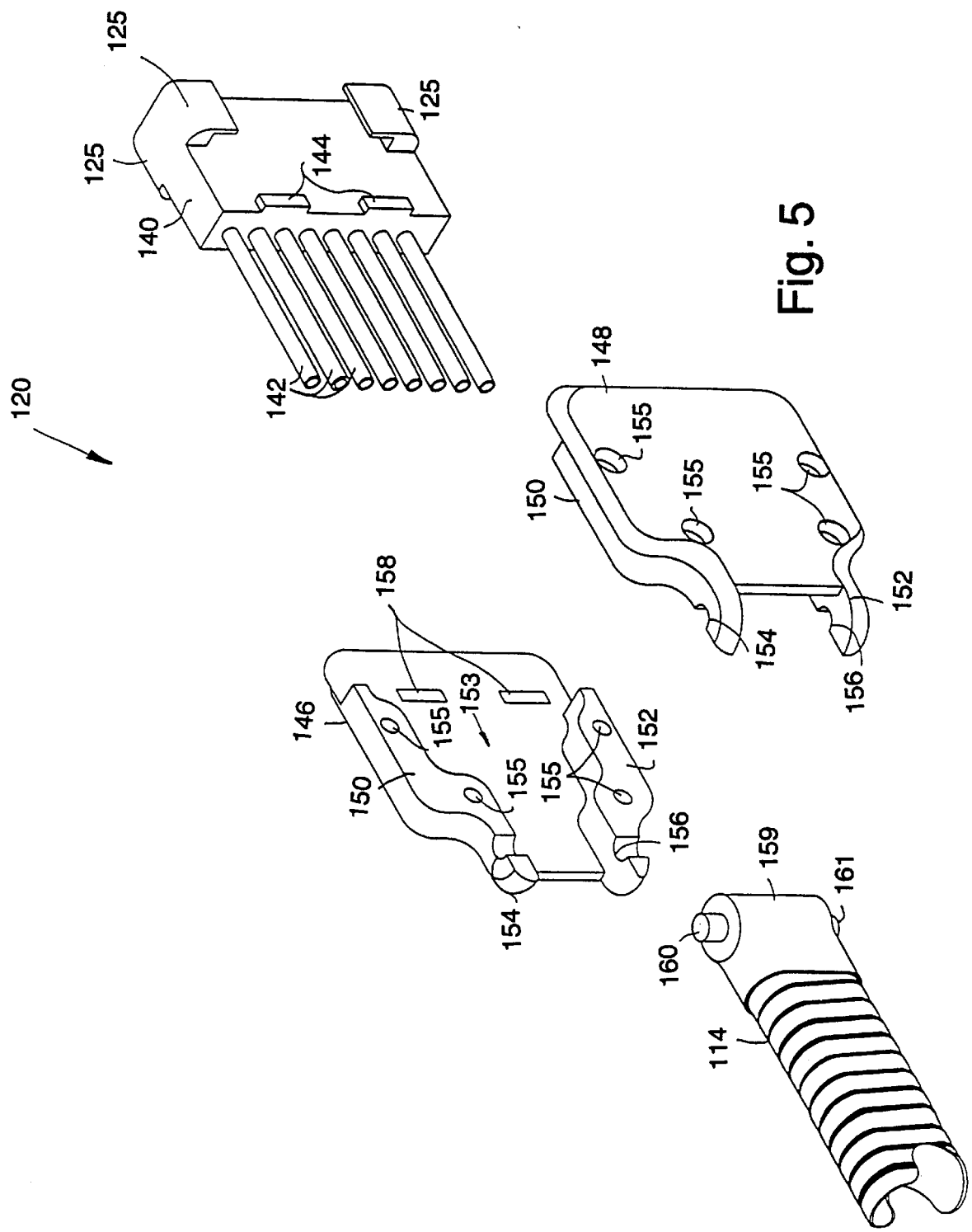
FIG. 5 is an exploded orthographic view of the pivotal cable assembly of FIG. 4.

The female receptacle connector 88 and the columns 38, 40 of female connector terminals 94 can each be provided with eight separate terminals for the reception of eight separate electrical wires (FIGS. 5, 8) from a power cable assembly 20. By way of example, these may include two ground terminal wires, three neutral wires and three positive wires representing three separate circuits, with a shared ground for two of the circuits. Similarly, 10-wire or 12-wire systems may be readily accommodated, having corresponding numbers of terminals on each of the connectors and providing a greater number of separate circuits. Some of the separate circuits may be dedicated circuits having surge protection, battery back-up, etc. for computers or other electrically sensitive equipment.

Referring again to FIG. 1, depending on the type of panel configuration used, a power cable assembly, for example assembly 20C, is pulled from an opening 25 in one raceway to an opening 27 in an adjacent raceway typically by a snake 23 or by any other well-known means. When assembly 20C includes a typical rigid male connector, it is extremely difficult to feed the connector portion around the corner created by the intersection of the two wall panels, since a longitudinal dimension of the connector portion is longer than the length of the diagonal defined between points 29, 29A of the intersecting panels.

According to one feature of the present invention, and referring to FIGS. 1 and 4–6, a power cable assembly 20 includes a conduit 114 attached to the pivotal male connector 120. The conduit 112 is preferably a flexible conduit which may be bent to accommodate a connection to adjacent panels which are disposed at angular positions with respect to each other, as well as in a straight line as shown in FIG. 1. The pivotal male connector 120 attaches to a junction block 22 or to another cable assembly having a mating female connector (not shown). As the pivotal male connector 120 is fed from one raceway to another in two adjacent wall panels, and as the male connector 120 (shown in phantom line) approaches the corner at the intersection of the two wall panels, a portion of the male connector will pivot to accommodate the corner, thus effectively shortening the length of the male connector.

Male connector 120 includes a male connector module 140 for housing male connector terminals 122A (FIG. 2) connected to electrical wires 142 and for supporting the flanges 125 as described above. A pair of lugs 144 are located on each side of connector module 140 distally from the flanges 125. A first connector housing half 146 is identical to a second connector housing half 148. Housing halves 146 and 148 each include an upper flange 150 and a lower flange 152. A plurality of holes 155 are located in each housing halves, such that when the housing halves are aligned, the holes are also aligned for securing the housing halves together through suitable fasteners, such as rivets, nut and bolt assemblies, etc. Upper flange 150 of each housing half includes a semi-cylindrical opening 154 for engaging a pin 160 attached to a collar 159 at the end of conduit 114, while lower flange 152 of each housing half includes a semi-cylindrical opening 156 for engaging a pin 161 attached to the collar 159. A pair of lug openings 158 are provided in each housing half to accommodate the lugs 144 located on each side of the connector module 140. The collar 159 is attached at an end of conduit 114 and includes the upper and lower pins 160, 161 integrally molded or otherwise attached thereto. Collar 159 includes an opening (not shown) which receives wires 142 when connector 120 is assembled. Upper and lower flanges 150, 152 define a funnel-shaped opening 153 to direct wires 142 into the conduit 114.

Figure 4:
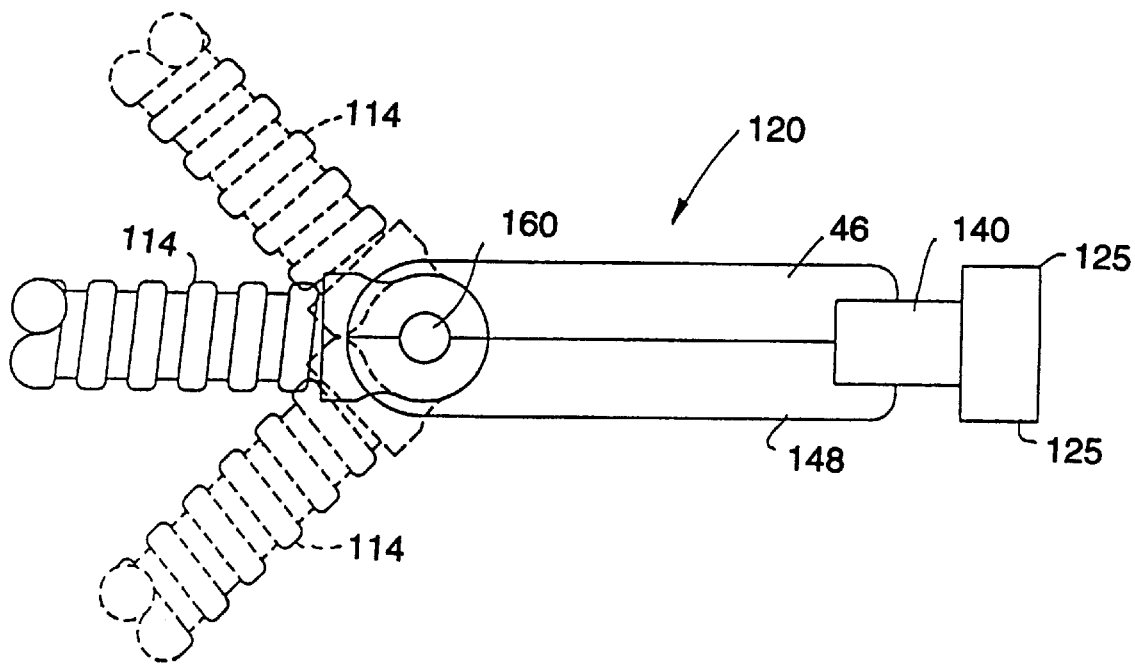
FIG. 4 is a top plan view of a pivotal cable assembly according to the present invention.
Figure 6:
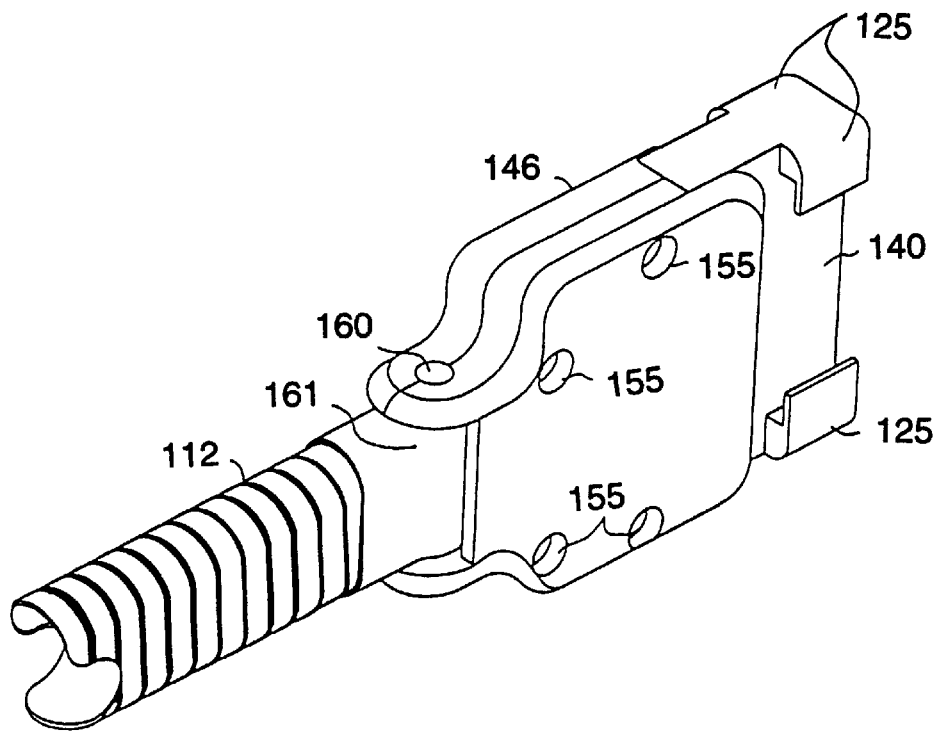
FIG. 6 is an orthographic view of the assembled components of FIG. 4.

In assembly, lugs 144 of module 140 are aligned with openings 158 while pins 160 and 161 of collar 159 are aligned with openings 154 and 156, respectively, of the two housing halves 146 and 148. The housing halves are then secured together with suitable fasteners through holes 155 into the pivotal assembly as shown in FIG. 6. Thus, male portion 120 can pivot through any desired angle with respect to conduit 114, as shown in FIG. 4 in phantom line, for fitting around tight corners in wall panel raceways.

Figure 7:
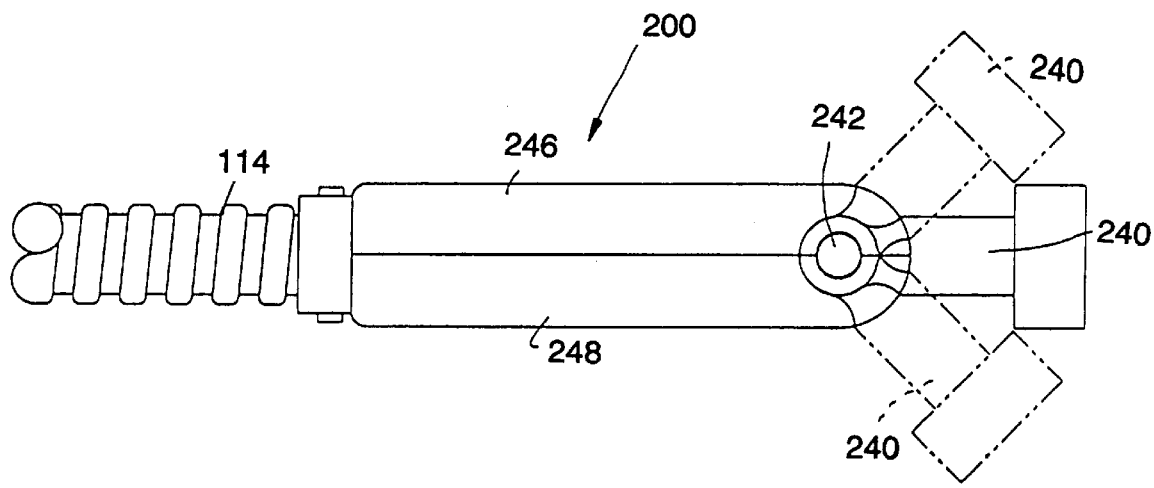
FIG. 7 is top plan view of a pivotal cable assembly according to a second embodiment of the present invention.
Figure 9:
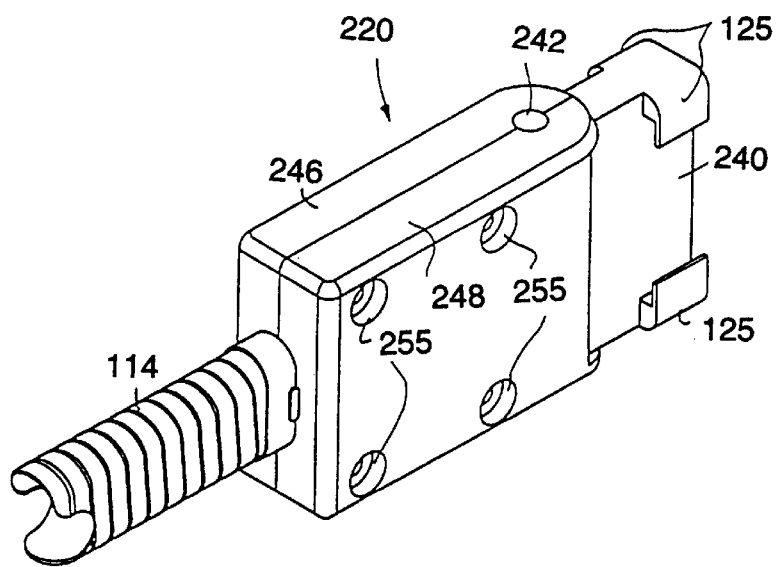
FIG. 9 is an orthographic view of the assembled components of FIG. 8.
Figure 8:
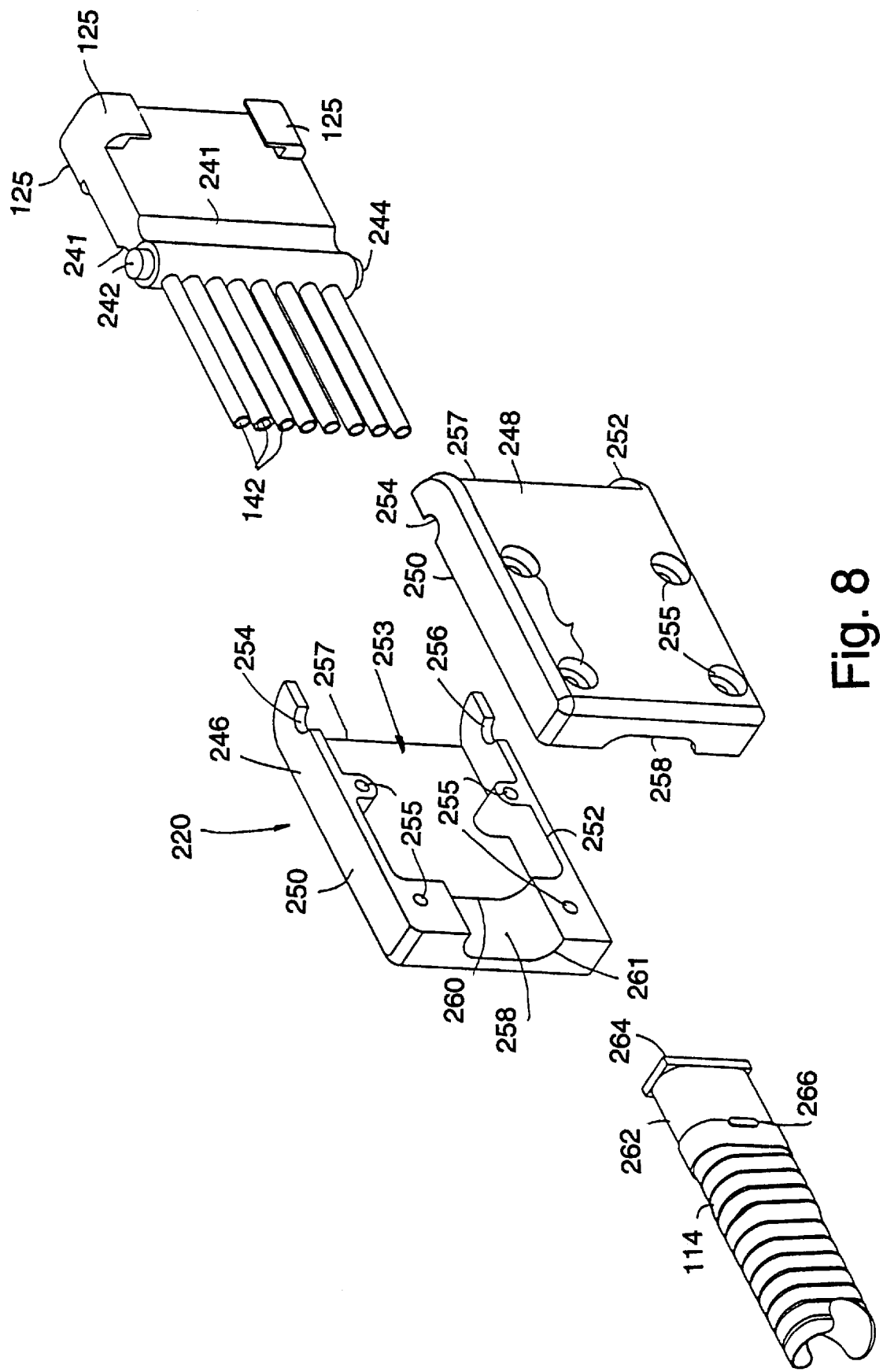
FIG. 8 is an exploded orthographic view of the pivotal cable assembly of FIG. 7.

Referring now to FIGS. 7–9, there is shown a second embodiment of a pivotal male connector 220 of a power cable assembly 20 according to a preferred arrangement of the present invention. Like numerals in the previous embodiment are used to identify like parts in the present embodiment, and therefore will not be described in further detail The power cable assembly 20 includes a flexible conduit 114 attached to the pivotal male connector 220. Male connector 220 includes a male connector module 240 for housing the male connector terminals 122A (FIG. 2) connected to electrical wires 142 and for supporting the flanges 125 as described above. An upper cylindrical pin 242 and lower cylindrical pin 244 are integrally or otherwise attached to the male connector module 240 distally from the flanges 125. A first connector housing half 246 is identical to a second connector housing half 248. Housing halves 246 and 248 each include an upper flange 250 and a lower flange 252. A plurality of holes 255 are located in each housing half, such that when the housing halves are aligned, the holes are also aligned for securing the housing halves together through suitable fasteners, such as rivets, nut and bolt assemblies, etc. Upper flange 250 of each housing half includes a semi-cylindrical opening 254 for engaging the upper pin 242 of module 240, while lower flange 252 of each housing half includes a semi-cylindrical opening 256 for engaging the lower pin 244 of module 240. A channel 258 having opposed channel edges 260, 261 is located in each housing half 246, 248 distally from the openings 254, 256. The channel 258 is shaped to accommodate a collar 262. The collar 262 is attached at an end of conduit 114 and includes two flanges 264, 266 integrally molded or otherwise attached thereto. Collar 262 includes an opening (not shown) which receives wires 142 when connector 220 is assembled. Upper and lower flanges 250, 252 define an opening 253 to direct wires 142 into the conduit 114. A pair of oppositely curved channels 241 are located adjacent to the pivot pins of module 240 in order to provide clearance for the outer edges 257 of the housing halves such that module 240 can rotate relative to the housing halves.

In assembly, pins 242 and 244 of module 240 are aligned with openings 254 and 256, respectively, of the two housing halves 246, 248. The collar 262 is aligned with channels 258 of the two housing halves such that flanges 264 and 266 are located at channel edges 260 and 261, respectively, to restrain the collar from movement. The housing halves are then secured together with suitable fasteners through holes 255 into the pivotal assembly as shown in FIG. 9. Thus, male connector module 240 can pivot through any desired angle with respect to conduit 114, as shown in FIG. 7 in phantom line, for fitting around tight corners in wall panel raceways.

Although the above description refers to a specific embodiment having a specific arrangement of male and female terminals with their mechanical interconnection, it is to be noted that such an arrangement is illustrative only. The male and female terminals and/or the mechanical interconnection may be reversed on the junction blocks, power cable assemblies, receptacle blocks, etc. to produce similar results.

It will be understood that the embodiments disclosed herein are only illustrative of the invention and numerous other arrangements may be devised by those skilled in the art without departing from the true spirit and scope of the invention.

What is claimed is:

1. An electrical interconnection assembly for use in a space-divider wall system including a plurality of modular upright wall panels having vertically extending opposite end edges and a raceway area extending between said opposite edges for supporting electrical conductors and junction blocks, said assembly adapted to be mounted in said raceway and comprising:

at least one junction block for receiving electrical receptacles and having connector terminals extending outwardly along said raceway area from at least one end of said junction block;

a power cable attached between said junction block and a power source for supplying power to said junction block, said power cable extending along said raceway area;

an electrical cable assembly having one end connected to said connector terminals of said junction block, said cable assembly comprising:

a male connector module for housing male connector terminals;

a pair of lugs located on each side of said male connector module;

a first connector housing half and an identical second connector housing half, each of said housing halves including an upper flange and a lower flange;

a plurality of holes located in each housing half, such that when the housing halves are aligned, said holes are also aligned for securing said housing halves together through fasteners;

said upper flange of each housing half having a semi-cylindrical opening for engaging a pin attached to a collar at an end of said power cable, while said lower flange of each housing half includes a semi-cylindrical opening for engaging a second pin attached to said collar;

each of said housing halves having a pair of lug openings so as to accommodate said lugs located on each side of said connector module; and said collar being attached at an end of said power cable and including said upper and lower pins integrally molded or otherwise attached thereto;

an end connector mechanically and electrically connected to another end of said electrical cable assembly, said end connector being pivotable relative to said electrical cable assembly and being connected to said power cable.

2. An electrical interconnection assembly in accordance with claim 1, characterized in that said power cable includes a flexible conduit directly attached to said end connector.

3. An electrical interconnection assembly in accordance with claim 1, characterized in that said electrical receptacles can be received in either a front portion or a rear portion of said junction block.

* * * * *